United States Patent
Chu

(10) Patent No.: US 7,046,382 B1
(45) Date of Patent: May 16, 2006

(54) NETWORK LATENCY RECOVERY FOR INTERNET GATEWAYS

(75) Inventor: Keith T. Chu, Laguna Niguel, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/345,269

(22) Filed: Jun. 30, 1999

(51) Int. Cl.
G06F 15/00 (2006.01)
H04L 12/56 (2006.01)
H04B 1/38 (2006.01)

(52) U.S. Cl. ............ 358/1.15; 358/1.15; 358/425; 370/401; 370/352; 375/222

(58) Field of Classification Search ........... 358/1.15, 358/425, 442; 375/222, 362; 370/229, 230, 370/235, 445, 395.6, 464, 401, 352; 455/427; 379/142.01, 93
See application file for complete search history.

(56) References Cited

U.S. PATENT DOCUMENTS

| | | | |
|---|---|---|---|
| 4,756,007 A * | 7/1988 | Qureshi et al. ............ 375/37 |
| 5,513,212 A * | 4/1996 | Bremer ................... 375/222 |
| 5,847,842 A * | 12/1998 | Maeda ................... 358/434 |
| 5,903,603 A * | 5/1999 | Kennedy et al. ......... 375/222 |
| 6,192,055 B1 * | 2/2001 | Rasanen ................. 370/465 |
| 6,317,455 B1 * | 11/2001 | Williams et al. ......... 375/222 |
| 6,437,870 B1 * | 8/2002 | Yoshida et al. .......... 358/1.15 |
| 6,463,132 B1 * | 10/2002 | Yoshida et al. .......... 379/93.09 |
| 6,483,600 B1 * | 11/2002 | Schuster et al. ......... 358/1.15 |
| 6,515,996 B1 * | 2/2003 | Tonnby et al. ........... 370/401 |
| 6,587,473 B1 * | 7/2003 | Terry et al. ............. 370/445 |
| 6,590,897 B1 * | 7/2003 | Lauffenburger et al. . 370/395.6 |

FOREIGN PATENT DOCUMENTS

EP 0 917 317 A1 5/1999

OTHER PUBLICATIONS

*T.38 and the Future of Fax; The Emerging Standard for Real-Time Fax Over IP*, Dialogic WorldView, http://www.dialogic.com, pp. 1-10.

*ITU-T Recommendation T.38; Procedures for Real-Time Group 3 Facsimile Communication Over IP Networks*, International Telecommunication Union, Jun. 1998, pp. 1-23.

(Continued)

Primary Examiner—Kimberly Williams
Assistant Examiner—Saeid Ebrahimi-Dehkordy
(74) Attorney, Agent, or Firm—Christopher J. Rourk; Godwin Pappas Langley Ronquillo LLP

(57) ABSTRACT

A communications system includes an internet protocol network, a calling modem and an answering modem configured to effectively handle network latency. The calling modem includes a timer storing a network latency value. The network latency value is compared to a network latency threshold. If the network latency threshold is less than the network latency value, then a high speed modem connection is continued. If the network latency value is greater than the network latency threshold, then the high speed modem connection is terminated. In place of the high speed modem connection, a low speed modem connection is established. The calling modem is operable to transmit a modem connection selection signal for selecting a high speed modem connection or a low speed modem connection. The answering modem is operable to receive the modem connection selection signal.

21 Claims, 5 Drawing Sheets

OTHER PUBLICATIONS

*ITU-T Recommendation V.34; Series V: Data Communication Over The Telephone Network*, International Telecommunication Union, Feb. 1998, pp., 1-82.

*ITU-T Recommendation V.8; Series V: Data Communication Over The Telephone Network*, International Telecommunication Union, Feb. 1998, pp., 1-13.

* cited by examiner

NETWORK LATENCY RECOVERY FOR INTERNET GATEWAYS

BACKGROUND

1. Field of the Invention

The present invention generally relates to network latency, and more particularly to network latency recovery for Internet gateways.

2. Description of the Related Art

T.38 is an emerging International Telecommunications Union (ITU) standard for fax transmission over Internal Protocol (IP) networks. The standard defines how Group 3 end-to-end facsimile terminals can connect to each other through the Internet. Fax has traditionally been transmitted over standard telephone lines. Transmitting fax over a data network presents new opportunities for enhanced fax delivery, such as real time fax.

The ITU-T T.38 recommendation, which is incorporated herein by reference, indicates that support for V.34 is for further study. V.34 is a standard for modems operating at data signalling rates of up to 33,600 bit/s.

SUMMARY OF THE INVENTION

Briefly, a communications system includes an internet protocol network, a calling modem and an answering modem configured to effectively handle network latency. The calling modem includes a timer storing a network latency value. The network latency value is compared to a network latency threshold. If the network latency value is less than the network latency threshold, then a high speed modem connection is continued. If the network latency value is greater than the network latency thershold, then the high speed modem connection is terminated. In place of the high speed modem connection, a low speed modem connection is established. The calling modem is operable to transmit a modem connection selection signal for selecting a high speed modem connection or a low speed modem connection. The answering modem is operable to receive the modem connection selection signal.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
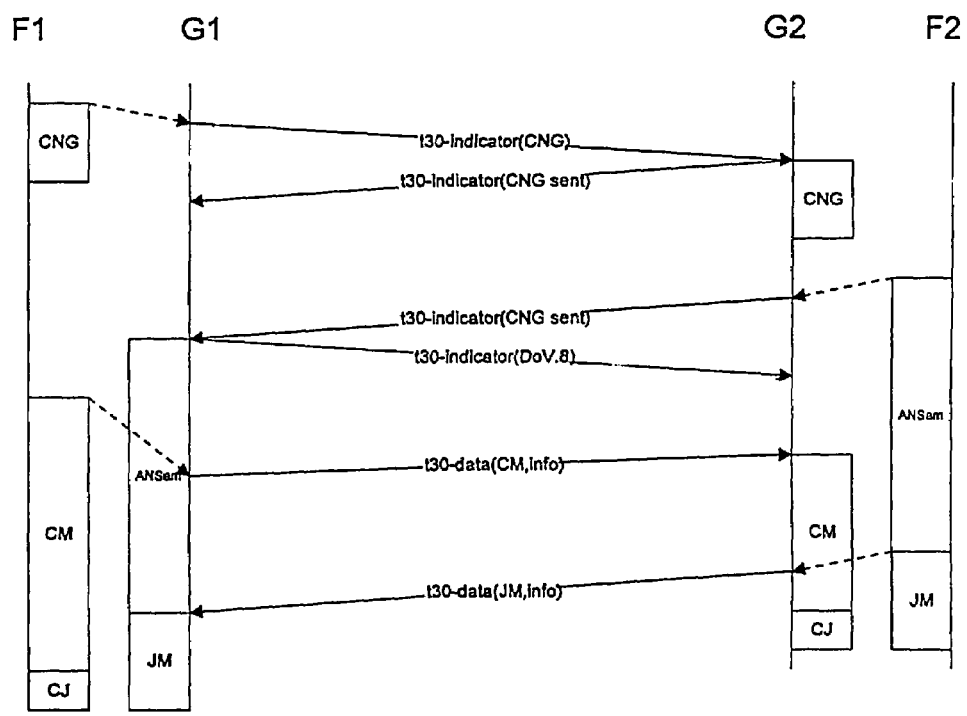
FIG. 1 is a diagram showing exemplary signalling between a calling side and an answering side of a communications system with an acceptable network latency.

Turning now to the drawings, FIG. 1 shows a communications system C including end-point facsimile terminals F1 and F2 and Internet T.38 gateways G1 and G2. F1 and G1 constitute the calling side of the system C, and F2 and G2 constitute the answering side of the system C. The gateway GI includes a calling modem, and the gateway G2 includes an answering modem. The facsimile gateways G1 and G2 allow for the facsimile terminals F1 and F2 to communicate transparently through an internet protocol (IP) network such as the Internet. Communication between the gateways G1 and G2, for example, can include transmitting a facsimile. With respect to facsimile communications, the calling gateway G1 encodes the fax signals into IP fax packets for transmission, and the answering gateway G2 decodes the transmitted IP fax packets back into fax signals. FI and GI can be embodied in an Internet-aware facsimile device, and F2 and G2 can be embodied in another Internet-aware facsimile device. F1 is shown sequentially providing a CNG signal sequence, a CM signal sequence, and a CJ signal sequence; G1 is shown sequentially providing an ANSam signal sequence and a JM signal sequence; G2 is shown sequentially providing a CNG signal sequence, a CM signal sequence, and a CJ signal sequence; and F2 is shown sequentially providing an ANSam signal sequence and a JM signal sequence. The design and operation of these signal sequences are understood in the art. The CNG, CM, CJ, and JM signals are defined and described in the ITU V.8 Recommendation, which is incorporated herein by reference as if set forth in its entirety.

Figure 3:
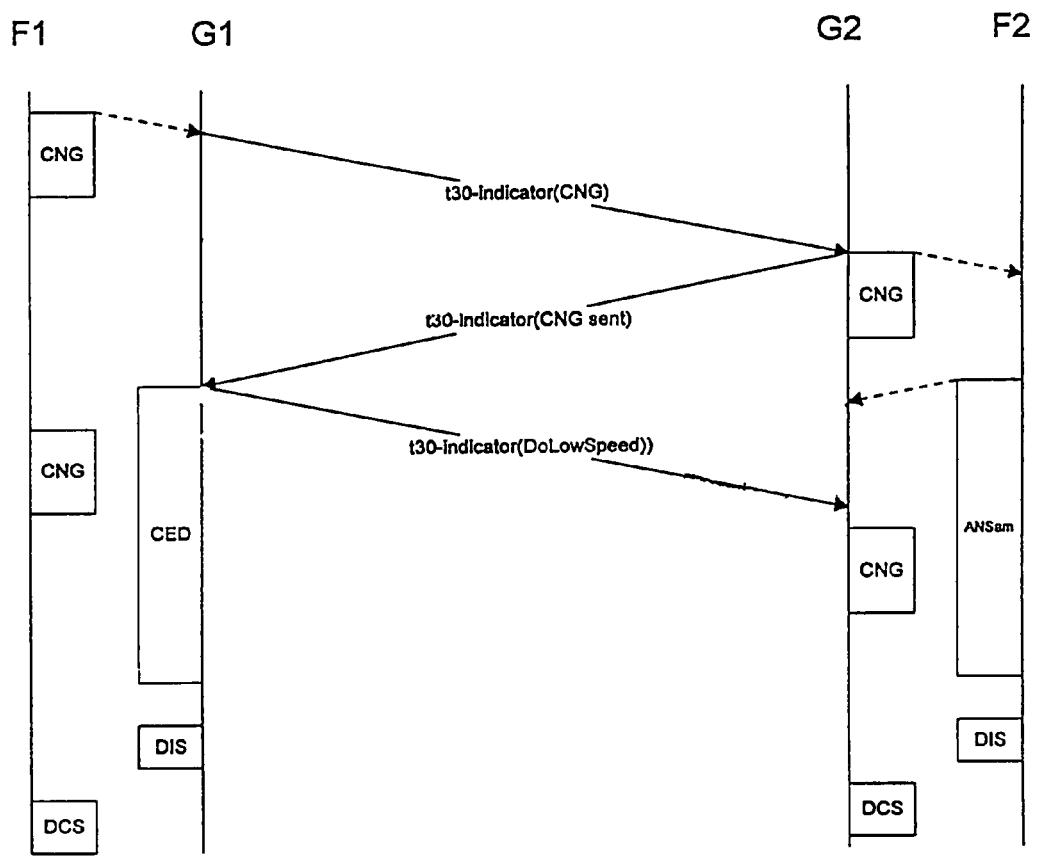
FIG. 3 is a diagram showing exemplary signalling between a calling side and an answering side of the communications system of FIG. 1 with an unacceptable network latency.

In addition to the standard T.38 signals, the signalling between the calling or emitting side and the answering or receiving side includes signals to accomplish network latency recovery. The standard T.38 signals shown between the gateways G1 and G2 are t30-data(JM, info), t30-data (CM, info), and t30-indicator(CNG). The T.38 signals added for network latency recovery are a t30-indicator(CNG sent) signal and a t30-indicator(DoV.8/Dolowspeed) signal. Certain signals are designated "t30" to reflect that the terminals F1 and F2 communicate during a T.30 session. The nature of a T.30 session is understood in the art. The designation also relates to the type of message in the particular signal. The t30-indicator (DoV.8/Dolowspeed) signal is shown as the t30-indicator(DoV.8) signal in FIG. 1 and is shown as the t30-indicator(Dolowspeed) signal in FIG. 3. The t30-indicator(CNG sent) signal is used to indicate to G1 if a CNG response has been transmitted by G2. The t30-indicator (DoV.8/Dolowspeed) signal is used to indicate whether a V.8 modem connection should continue or if a Group 3 modem connection should be established. Network latency is here defined as the time between transmission of the t30-indicator (CNG) signal and reception of the t30-indication(CNG sent) signal. If network latency is acceptable, then G1 responds with the t30-indicator(DoV.8) signal (FIG. 1). If network latency is unacceptable, then G1 responds with the t30-indicator(Dolowspeed) signal (FIG. 3). Normally, G2 and F2 have up to 4 seconds to respond with a V.8 signal, so it is proper to allow G2 to continue with CNG until G2 receives the t30-indicator(DoV.8/Dolowspeed) signal.

Figure 2A:
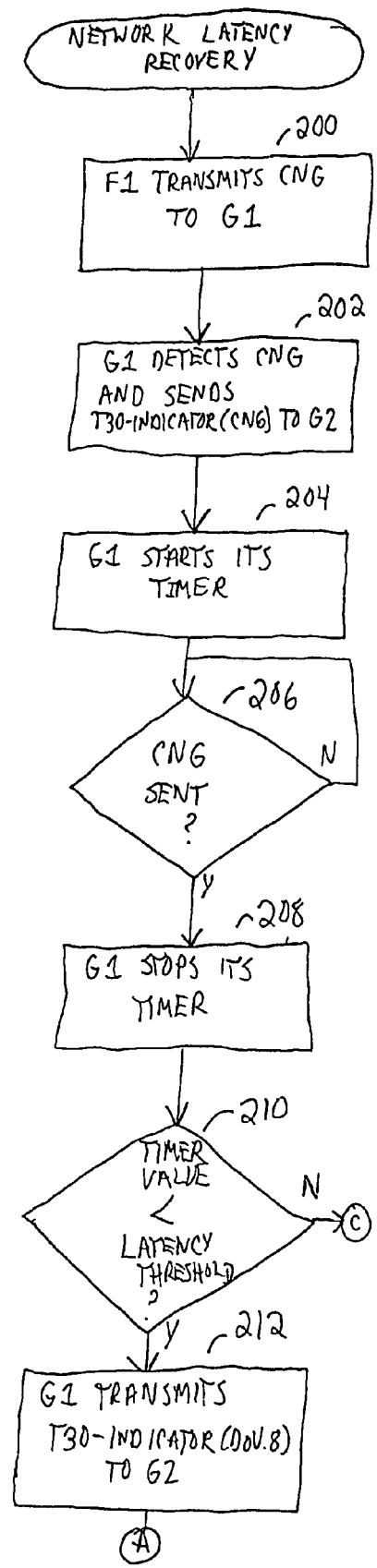
FIGS. 2A–2B provide a flow chart of an exemplary network latency recovery process in accordance with the signalling and communications system of FIG. 1.
Figure 2B:
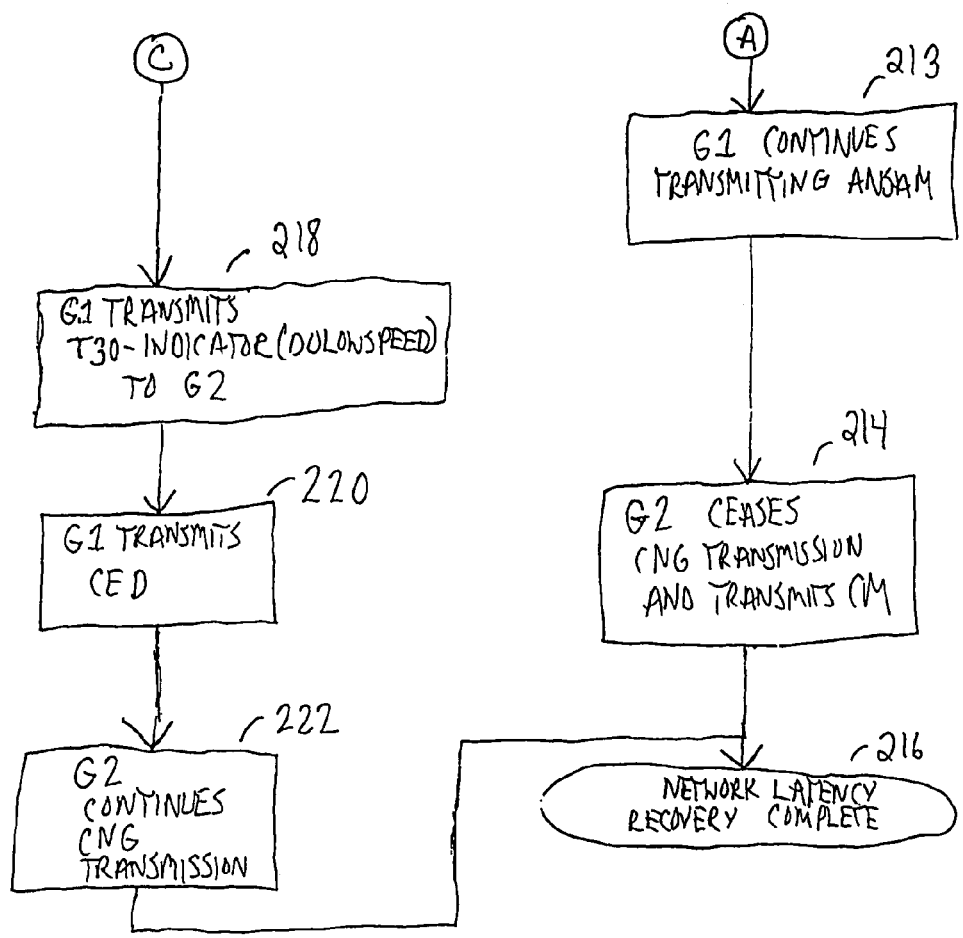
Figure 4:
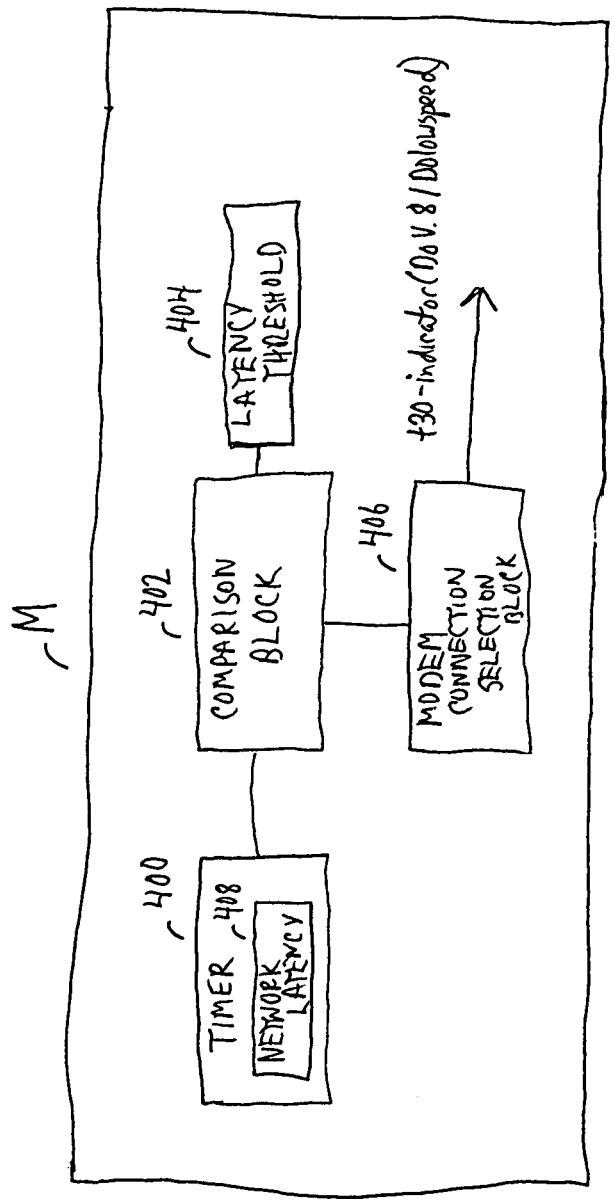
FIG. 4 is a block diagram of a calling modem in a calling gateway of FIGS. 1 and 3.

Referring to FIGS. 2A–2B, a flowchart of an exemplary network latency recovery process in accordance with the signalling and communications system C of claim 1 is shown. The process begins in step 200 where F1 transmits a CNG to G1. Next, in step 202, G1 detects the CNG and in response sends the t30-indicator(CNG) signal to G2. G2 is thereby informed to start transmitting CNG. From step 202, control proceeds to step 204 where G1 starts its timer 400 (FIG. 4). Control next proceeds to step 206 where it is determined by G1 if a CNG sent signal has been received from G2. Control remains in step 206 until the CNG sent signal is received from G2. When the CNG sent signal is received, control proceeds to step 208 where G1 stops its timer 400. Based on the starting time and stopping time of the timer 400, G1 now stores a network latency timer value 408 (FIG. 4). When the network latency timer value 408 is too long, the high speed modem connection (in this case, a V.8 connection) fails. Until the CNG sent signal is received, G1 holds off transmission of an ANSam signal.

Next, in step 210, it is determined if the timer value 408 is below an acceptable latency threshold 404 (FIG. 4). If so, then control passes to step 212 where G1 transmits the t30-indicator(DoV.8) signal to G2. Next, in step 213, G1 continues transmitting ANSam since the timer value 408 was below an acceptable latency threshold 404. From step 213, control proceeds to step 214 where G2 ceases CNG transmission and transmits CM based upon the CM contents of F1. Next, the network latency recovery process is completed in step 216.

Referring to FIG. 3, the communications system C and associated signalling is shown for an unacceptable network latency. The F1 is shown sequentially providing two CNG signal sequences and a DCS signal sequence; G1 is shown sequentially providing a CED signal sequence and a DIS sequence; G2 is shown sequentially providing two CNG signal sequences and a DCS signal sequence; and F2 is shown sequentially providing an ANSam signal sequence and a DIS signal sequence. The design and operation of these signal sequences are understood in the art. In terms of FIG. 2, steps 210–214 are specific to FIG. 3. Steps 200–10 are applicable to both FIG. 1 and FIG. 3. In step 210, if the timer value 408 is above the acceptable latency threshold 404, then control passes to step 218 where G1 transmits the t30-indicator(Dolowspeed) signal to G2 (FIG. 3). Next, in step 220, G1 transmits CED, instead of ANSam, forcing F1 to use V.17 (a standard for data signalling rates up to 14,400 bit/s) and lower procedures. A switch from one modem version to a previous modem version has generally been termed a "fallback." G1 continues to send CED while the timer value 408 is above the acceptable latency threshold 404. From step 220, control passes to step 222 where G2 continues with its CNG transmission, forcing F2 to use V.17 and lower procedures. The network latency recovery process is then completed in step 216.

Referring to FIG. 4, exemplary components of a calling modem M in the calling gateway G1 is shown. The modem M includes a comparison block 402 coupled to a timer 400, a latency threshold 404, and a modem connection (or modulation mode) selection block 406. The timer 400 stores the network latency value 408 described above. The comparison block 402 compares the network latency value 408 to the network latency threshold 404 described above. Based on the result of that comparison, the modem connection selection block 406 generates either the t30-indicator (DoV.8) signal or the t30-indicator(Dolowspeed) signal. If the network latency value 408 is less than the latency threshold 404, then the modem connection selection block 406 generates a t30-indicator(DoV.8) signal. If the network latency value 408 is greater than the latency threshold 404, then the modem connection selection block 406 generates the t30-indicator(Dolowspeed) signal. It should be understood that the illustrated components can be implemented in a variety of ways (hardware or software).

Thus, when network latency is greater than an acceptable value, a high speed modem connection is bypassed for a low speed modem connection. The high speed modem connection, for example, can be a V.8 modem connection, and the low speed modem connection can be a Group 3 modem connection. Also, the high speed modem connection can be a V.34 half-duplex connection. It should be understood that the network latency recovery techniques described herein are applicable to a variety of modem connections or modulation modes. In addition, while network latency recovery is described in a modem context, it should be understood that the network latency recovery techniques described herein are applicable to other communication devices with similar structure and/or operation. Other ways of suspending or terminating a high speed modem connection based on current network latency without departing from the spirit of the invention are possible. Likewise, other ways of selectively operating a high speed modem connection and a low speed modem connection based on current network latency without departing from the spirit of the invention are possible.

We claim:

1. A communications system configured for network latency recovery, comprising:
   an internet protocol network;
   a calling modem coupled to the internet protocol network, the calling modem including a timer, the timer being operable to store a network latency value, the calling modem being operable to compare the network latency value to a network latency threshold, to transmit a low speed modem connection selection signal if the network latency value is greater than the network latency threshold, and to transmit a high speed modem connection selection signal if the network latency value is less than the network latency threshold; and
   an answering modem coupled to the internet protocol network, the answering modem being operable to receive the low speed modem connection signal and the high speed modem connection signal.

2. The communications system of claim 1, further comprising:
   a calling facsimile terminal coupled to the calling modem; and
   an answering facsimile terminal coupled to the answering modem.

3. The communications system of claim 1, wherein a T.38 calling gateway includes the calling modem and a T.38 answering gateway includes the answering modem.

4. The communications system of claim 1, wherein the high speed modem connection selection signal selects a V.8 modem connection.

5. The communications system of claim 1, wherein the low speed modem connection selection signal selects a Group 3 connection.

6. The communications system of claim 1, wherein the high speed modem connection selection signal selects a V.34 half-duplex connection.

7. A calling modem configured for network latency recovery comprising:
   a timer to store a network latency value;
   a comparison block to compare the network latency value and a network latency threshold; and
   a modem connection selection block to transmit a low speed modem connection selection signal if the network latency value is less than the network latency threshold and to transmit a high speed modem connection signal if the network latency value is greater than the network latency threshold.

8. The calling modem of claim 7, wherein the high speed modem connection selection signal selects a V.8 modem connection.

9. The calling modem of claim 7, wherein the low speed modem connection selection signal selects a Group 3 connection.

10. The calling modem of claim 7, wherein the high speed modem connection selection signal selects a V.34 half-duplex connection.

11. A method of handling network latency in a T.38 compatible environment, comprising the steps of:
storing a network latency value;
comparing the network latency value to a network latency threshold;
transmitting a low speed modem connection signal if the network latency value is less than the network latency threshold; and
transmitting a high speed modem connection selection signal if the network latency value is less than the network latency threshold.

12. The method of claim 11, wherein the high speed modem connection selection signal selects a V.8 modem connection.

13. The method of claim 11, wherein the low speed modem connection selection signal selects a Group 3 connection.

14. The method of claim 11, wherein the high speed modem connection selection signal selects a V.34 half-duplex connection.

15. A system for handling network latency, comprising:
means for operating a high speed modem;
means for comparing a network latency to a network latency threshold;
means for continuing operation of the high speed modem if the network latency is less than the network latency threshold; and
means for terminating operation of the high speed modem if the network latency is greater than the network latency threshold.

16. The system of claim 15, further comprising:
means for establishing a low speed modem connection if the network latency is greater than the network latency threshold.

17. The system of claim 16, further comprising:
means for providing a low speed modem selection signal if the network latency is greater than the network latency threshold for establishing a low speed modem connection step.

18. The system of claim 16, wherein the means for establishing the low speed modem connection comprises means for establishing a Group 3 connection.

19. The system of claim 15, wherein the means for operating the high speed modem comprises means for operating a V.8 modem connection.

20. The system of claim 15, further comprising means for providing a high speed modem selection signal to indicate continuing operation of the high speed modem if the network latency is less than the network latency threshold.

21. The system of claim 15, wherein the means for operating the high speed modem comprises means for operating a V.34 half-duplex connection.

* * * * *